UNITED STATES PATENT OFFICE.

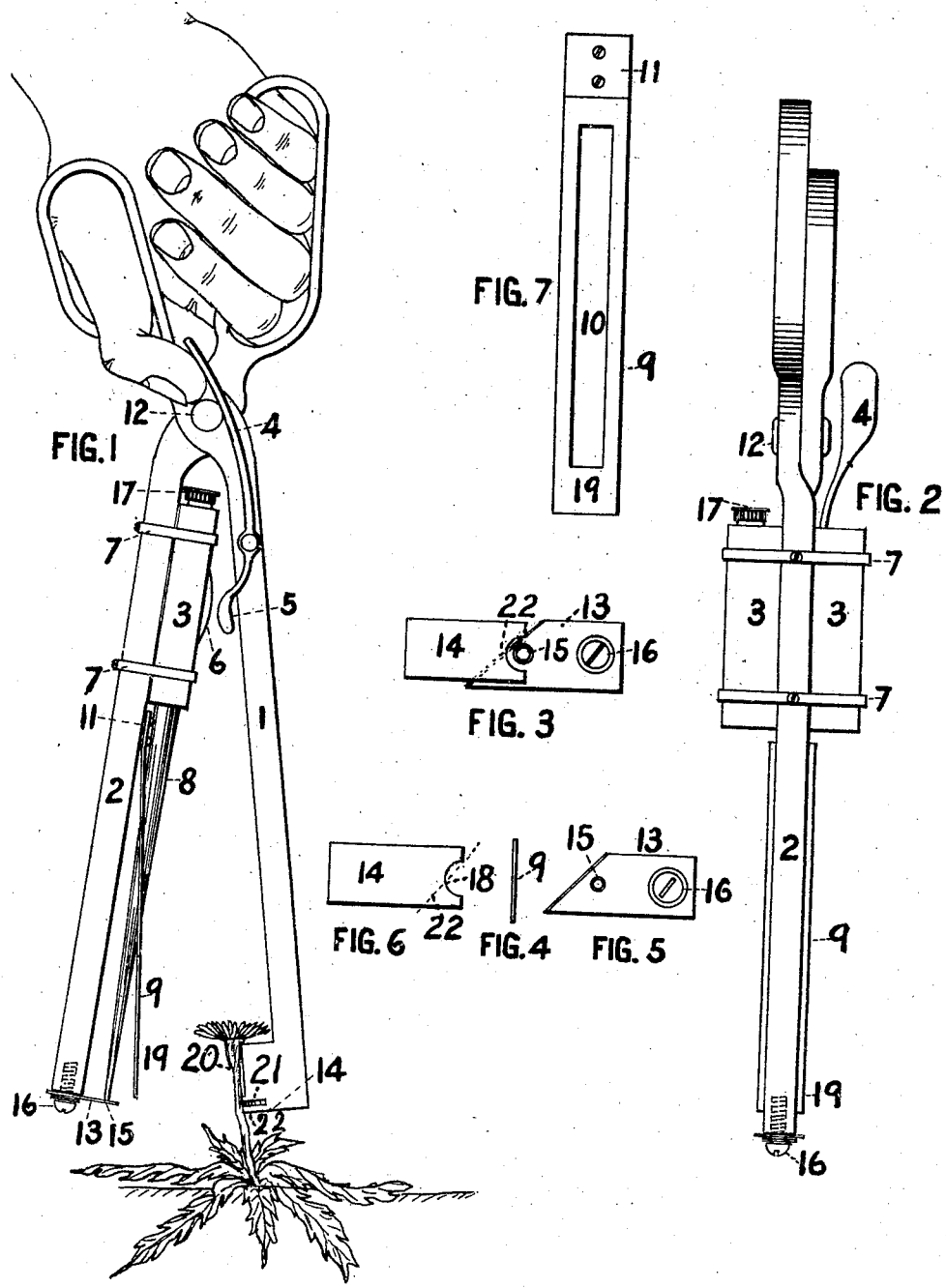

LEWIS C. McALLISTER, OF COLORADO SPRINGS, COLORADO.

DESTROYER OF DANDELIONS.

954,126.  Specification of Letters Patent.  Patented Apr. 5, 1910.

Application filed October 12, 1908. Serial No. 457,206.

*To all whom it may concern:*

Be it known that I, LEWIS C. McALLISTER, a citizen of the United States, residing at Colorado Springs, in the county of El Paso and State of Colorado, have invented a new and useful Destroyer of Dandelions and other Obnoxious Plants.

My invention relates to improvements in plant destroyers, in which a scissors hinged tongs is provided at its lower extremity with an incision blade suitable to cut into the plant, and having a discharge tube arranged so as to inoculate the plant with some suitable herbicide supplied from a reservoir directly connected on the machine and operated at the will of the operator, by a separate device and having means for holding the plant and machine in a relative position during the process of incision, and procuring of inoculation by injecting of the herbicide. I attain these objects by the mechanism illustrated in the accompanying drawings of which the following is a specification.

Figure 1 is a vertical front view of the entire machine in the hand of the operator, with the prongs open, about to grasp the stem. Fig. 2 is a vertical edge view of Fig. 1, minus the hand. Fig. 3 is a bottom view actual size of incision blade 13, and holder 14, showing the orifice 15, at the bottom end of discharge tube 8. Fig. 4 is the bottom view of the end of retention spring 9. Fig. 5 is a bottom view of incision blade 13, showing the orifice 15, of discharge tube 8, and also showing screw 16. Fig. 6 is a bottom view of holder 14, showing recess 18, for the reception of the stem of the plant. Fig. 7 is a vertical side view of retention spring 9, drawn actual size, showing the long slot through which the discharge tube extends.

Similar figures refer to similar parts throughout the several views.

The scissors hinged tongs 1 and 2, having suitable handles and having at their lower end a holder and incision blade and having a retention spring 9, and discharge tube 8; with reservoir 3, and levers 4 and 5, constitute the principal parts of my machine. The two arms 1 and 2, are hinged at 12, like common scissors and arm 1, is provided at its bottom end with a projection having a large surface on the side toward the arm 2, which surface has a semi-circular recess 18, to receive the stem of a plant.

When the operator prepares to destroy a dandelion or other obnoxious plant, he first removes cap 17, then fills reservoir 3, with some herbicide, as gasolene, then replacing the cap he grasps the destroyer in the manner as shown by the hand in Fig. 1, with the terminal ends of arms 1 and 2, downward. This allows the liquid in the reservoir 3, to run down into discharge tube 8. He then grasps the leaf or stem of a plant, as the one shown at 20, between the holder 14, and the bottom end 19, of retention spring 9, by compressing the handles of the destroyer; 19, forcing the plant against holder 14, which holds it in place until incision blade 13, cuts into the side of the plant 20, cutting an incision therein, but not entirely severing the plant, by cutting it about half through then while the operator holds the destroyer in this position the incision in the plant will be forced into contact with the orifice 15, of discharge tube 8, and at this junction and in those conditions the operator presses the lever 4, with his thumb as shown in Fig. 1, till the end 5, of said lever is compressed against the swell side 6, of reservoir 3, which causes an expulsion of the herbicide from reservoir 3, down through orifice 15, into the incision in the stem of the plant 20, thus inoculating it with the herbicide for the purpose of having it conveyed down through the plant to the root of the same to destroy it.

In the front side of holder 14, is a narrow recess 21, to receive the cutting edge of blade 13, and the bottom lip 22, of said recess assists in holding the stem of the plant during the process of incision and inoculation. By opening the hand the destroyer is then ready to grasp another plant, as shown in Fig. 1.

In Fig. 7 the retention spring 9, is shown actual size with means for fastening it at the end 11, to the inner surface of arm 2, just below reservoir 3. This retention spring projects downwardly and outwardly from a parallel with arm 2, and toward arm 1, and is intended to grasp the plant on its side opposite to the side which would be forced into recess 18, of the holder 14. To allow the discharge tube 8, to pass in a direct line through this retention spring 9, and to allow a free swing motion by retention spring 9, there is provided a slot 10, through which discharge tube 8, passes in its course from reservoir 3, to and through blade 13.

Fig. 3 represents the bottom end of destroyer closed, showing blade 13, pressed nearly through to the bottom of recess 18, and the orifice 15, passing into the outer opening of recess 18, which would press it in contact with the incision in any plant that can be held adjustably in recess 18. Incision blade 13, is held in place at the bottom end of arm 2, by means of screw 16; passing through the incision blade 13, in a slotted hole, longitudinally with the blade and reservoir 3, is securely held against the inner side of arm 2, by means of clamps 7—7. The thumb lever has arms 4 and 5, hinged on arm 1, at a suitable position so that the end of arm 5 will reach the swell side of reservoir 3, and so that thumb arm 4, will be in convenient reach of the thumb of the operator, while holding handles of the destroyer.

I am aware that prior to my invention destroying machines have been invented for the purpose of cutting dandelions and other obnoxious plants and with devices for the purpose of sprinkling herbicide upon the roots or stem of such plants. I therefore, do not claim broadly a combination for this purpose; but

I claim:—

1. In an instrument for destroying weeds by means of injecting a herbicide, a tongs, comprising two arms pivoted together near their upper end, handles on the short end of the arms, one of the long arms carrying a reservoir with a collapsible side, means for compressing the collapsible side of the said reservoir, a cutting blade attached to the end of one of the long arms, the blade being provided with an orifice near its cutting edge, and means for conveying the herbicide from the reservoir to the orifice of the cutting blade, all substantially as set forth and for the purposes as specified.

2. In an instrument for destroying weeds by means of injecting a herbicide, a scissors hinged tongs, a reservoir with a collapsible side attached to one of its long arms, a lever adjusted to compress its collapsible side, a cutting blade attached to the end of one of the long arms arranged to form an incision in the stem of a weed, the blade being provided with an orifice near its cutting edge, a tube connecting said reservoir with the orifice in said cutting blade suitable to convey a herbicide substance from the reservoir through the orifice in the cutting blade, all substantially as set forth and for the purposes as specified.

3. In an instrument for destroying weeds by means of injecting a herbicide, a scissors hinged tongs, provided on its short arms with handles, a collapsible reservoir attached to one of its long arms, a lever pivoted so as to compress the collapsible side of the said reservoir by the hand of the operator, a holder attached to the extremity of one of the long arms of the tongs and being provided with a recess at its face projecting toward the opposite long arm and suitable to receive the stem of a plant, a blade attached to the extremity of the opposite long arm and having a cutting edge suitable to engage said holder so as to make an incision into the stem of a plant while in said holder without severing same entirely, the blade being provided with an orifice, a tube connecting said reservoir with the orifice in the blade, substantially as set forth and for the purposes as specified.

4. In an instrument for destroying weeds by means of injecting a herbicide, a tongs having a scissors hinge, suitable handles on the short arms of the said tongs, a reservoir having a collapsible side on one of the long arms, means for compressing said reservoir by the hand of the operator, means provided at the ends of the long arms for cutting an incision into the stem of a weed, a tube connecting said reservoir with said incision making instrument, all substantially as set forth and for the purposes as specified.

5. In an instrument for destroying weeds by means of injecting a herbicide, a scissors hinged tongs, handles provided on the short arms thereof, the extremity of one of the long arms having an incision blade projecting toward the extremity of the opposite long arm, the blade being provided with an orifice the extremity of the opposite long arm having a holder block projecting toward the incision blade and having a recess in its projecting face suitable to receive the stem of a weed and arranged so that the incision blade cannot entirely sever the stem, a compression spring on the incision blade arm projecting toward the holder suitable to compress the stem of a weed into the recess in the face of said holder, a reservoir having a collapsible side and a tube connecting it with the orifice in the blade, a pivoted lever suitable to compress the collapsible side of said reservoir by the pressure of the hand of the operator, all substantially as set forth and for the purposes specified.

6. In an instrument for destroying weeds by means of injecting a herbicide, a tongs having a scissors hinge, suitable handles on the short arms of said tongs, a reservoir adapted to contain a fluid or powder, said reservoir being attached to one of the long arms of said tongs and having a collapsible side, means for compressing said reservoir by the hand of the operator, a cutting blade attached to the end of one of the long arms and projecting toward the end of the other long arm, the blade being provided with an orifice a holder attached to the end of the other long arm and projecting toward the cutting blade and having a recess in its face provided to receive the stem of a weed and press it against the edge of the cutting blade in such a manner that it cannot be completely severed, a tube connecting said reservoir with the orifice in the cutting blade provided to convey a fluid or powder from said reservoir, through the orifice in the blade and into an incision in the stem of a weed, all substantially as set forth and for the purposes as specified.

7. In a dandelion destroyer, a tongs having a scissors hinge, suitable handles on the short arms of said tongs, a reservoir adapted to contain a fluid or powder, said reservoir being attached to one of the long arms of said tongs and having a collapsible side, means for compressing said reservoir with a lever by the hand of the operator, a cutting blade attached to the end of one of the long arms and projecting toward the end of the other long arm, the blade being provided with an orifice a holder attached to the end of the other long arm and projecting toward the cutting blade and having a recess in its face provided to receive the stem of a weed and press it against the edge of the cutting blade in such a manner that it cannot be completely severed, a tube connecting said reservoir with the orifice in said cutting blade provided to convey a fluid or powder from said reservoir through the orifice in the blade into an incision in the stem of a weed, all substantially as set forth and for the purposes as specified.

LEWIS C. McALLISTER.

Witnesses:
J. L. SCHAEFER,
HOMER LAUGHLIN.